United States Patent [19]
Broz et al.

[11] Patent Number: 5,542,587
[45] Date of Patent: Aug. 6, 1996

[54] INFANT CARRIER INSTALLABLE ON A BICYCLE

[76] Inventors: Jayne I. Broz; Gordon A. Broz, both of 49 Orchard St., Merrimac, Mass. 01860

[21] Appl. No.: 323,742

[22] Filed: Oct. 17, 1994

[51] Int. Cl.[6] ........................................ B62J 7/04
[52] U.S. Cl. .................. 224/415; 224/417; 224/422; 224/424; 224/430; 224/440; 224/448; 280/202; 297/195.13; 297/183.3; 2/421
[58] Field of Search .................. 224/32 A, 32 R, 224/31, 39; 280/202; 297/195.13, 183.3, 393; 2/205, 422, 410, 421

[56] References Cited

U.S. PATENT DOCUMENTS

| | | | |
|---|---|---|---|
| 4,053,091 | 10/1977 | Martelet | 224/32 A |
| 4,371,206 | 2/1983 | Johnson, Jr. | 297/183.3 |
| 4,440,331 | 4/1984 | Schimmels | 224/31 |
| 5,299,818 | 4/1994 | Newbold | 224/32 A |
| 5,322,343 | 6/1994 | Parker et al. | 297/183.3 |
| 5,370,441 | 12/1994 | Chaung | 297/195.13 |

Primary Examiner—Linda J. Sholl
Attorney, Agent, or Firm—Frederick R. Cantor, Esq.

[57] ABSTRACT

An infant carrier is mounted on a platform located directly over the rear wheel of a bicycle, such that the infant can become a passenger along with the bicyclist. The carrier has an arcuate cradle-like configuration that causes the infant to be in a semi-prone inactive position in the carrier. A helmet is releasably retained on the carrier body to provide head protection for the infant. A retention strap encircles the helmet to stabilize the helmet position, and to reduce the loading of the helmet on the infant's head and neck muscles. The carrier is selectively positionable on the platform to face either toward the front or the rear. The carrier is detachably mounted so that it can be used for carrying the infant when the carrier is in a detached condition.

5 Claims, 1 Drawing Sheet

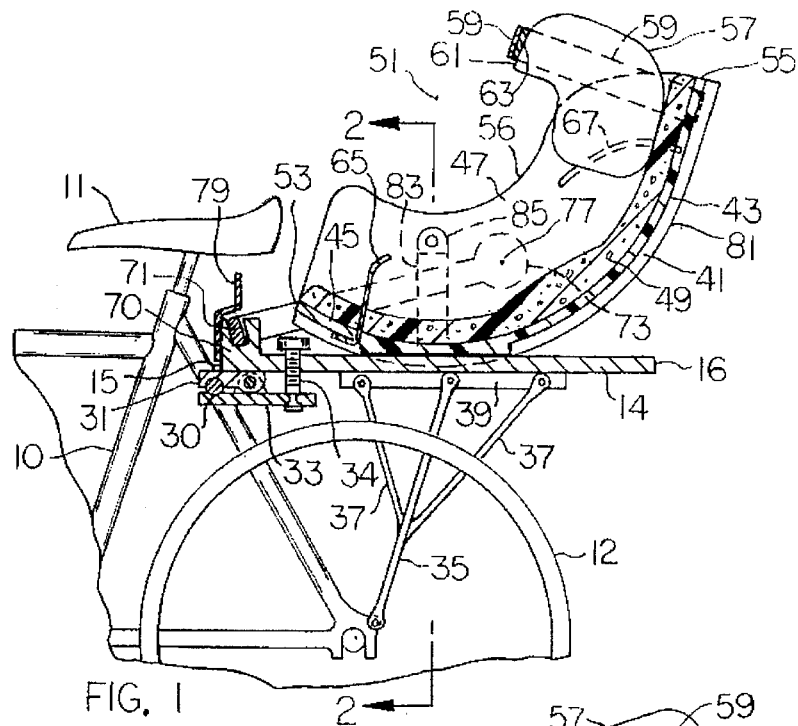
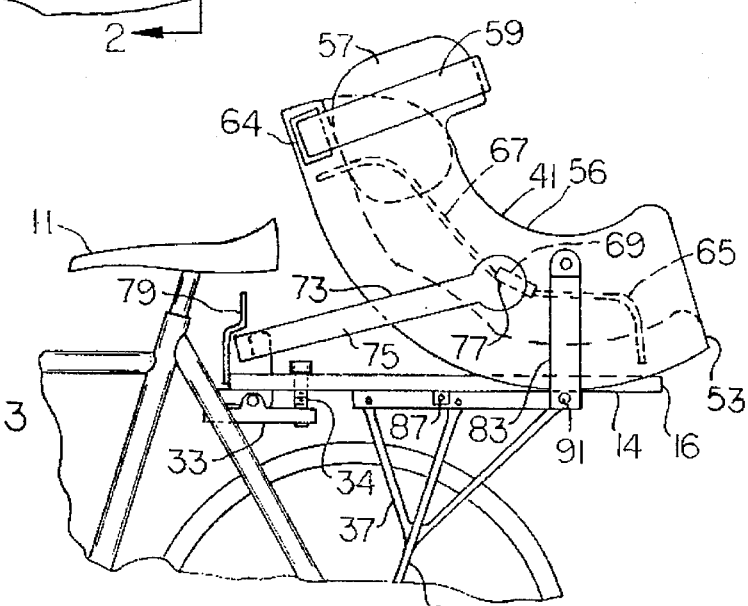
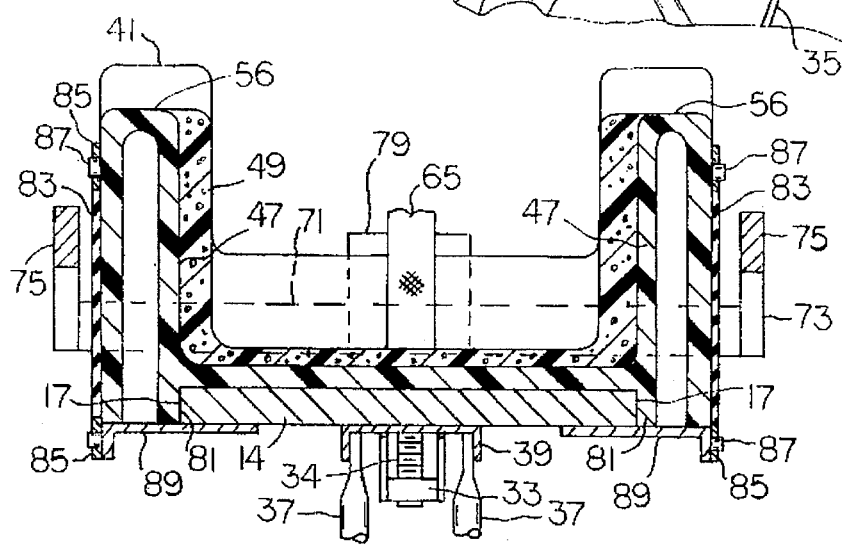

INFANT CARRIER INSTALLABLE ON A BICYCLE

BACKGROUND OF THE PRESENT INVENTION

1. Field of the Invention

The present invention relates to a carrier for an infant child.

The present invention relates, more particularly, to a carrier for an infant child, wherein the carrier is installable on a bicycle directly over the bicycle rear wheel behind the bicycle seat.

2. Prior Developments

The present invention is concerned with an infant safety carrier installable on a bicycle. The term "infant" is herein used to mean a child no older than about two years.

Prior to this invention various child carrier systems for use on bicycles have been proposed. However, none of these child carrier system is believed to be suitable for very small infants, i.e., small children less than two years old. The present invention is concerned with a child carrier installable on a bicycle, and suitable for safely holding infants no more than about two years old.

U.S. Pat. No. 4,440,331, issued to K. L. Schimmels, discloses a child carrier installable on a bicycle. The carrier comprises a seat portion positionable on a horizontal bracket over a wheel of a bicycle, and a backrest section pivotably joined to the seat portion. The carrier can be disconnected from the bracket for disposition on the seat of an automobile.

One problem with the carrier shown in the Schimmels patent is that the child's head is unprotected. In the event that the bicycle should tip over, the child seated in the carrier will likely experience a head injury. Also, with the Schimmels child carrier, the child's arms are located outside the protective side walls of the carrier. In the event of a tip-over accident, the child can possibly have an arm come into forcible contact with the pavement or ground surface, thereby, producing a serious injury.

U.S. Pat. No. 3,802,598, issued to I.E. Burger, et al., discloses a child carrier that includes a seat element having an upstanding backrest and side walls that gives the carrier a bucket configuration. Two downwardly extending footholds are provided at the front edge of the seat element.

The carrier of U.S. Pat. No. 3,802,598, is designed for a child that is able to sit erect, in an upright position, using hands and arms for steadying purposes. The patented carrier cannot be used to hold infants, less than two years old, who cannot sit erect without assistance.

U.S. Pat. No. 3,873,127, issued to M. McNichol, et al, on Mar. 25, 1975, shows a seat structure that includes a seat element, an upright backrest, and a connector section that can have different inclinations to meet different user requirements. The patented seat structure is designed for use by adults, and it could not be used by infants and small children with any degree of personal safety.

SUMMARY OF THE PRESENT INVENTION

The present invention relates to a carrier for an infant child.

The present invention relates, more particularly, to an infant carrier adapted to be installed on a bicycle directly over the bicycle rear wheel. The carrier comprises a cradle-shaped carrier body having a continuous arcuate wall structure that forms the lower wall and rear wall of the carrier. Two side walls extend from the arcuate wall structure to form a protective enclosure for an infant lying in a semi-prone position on the arcuate wall structure.

The infant is required to assume a semi-prone position within the carrier so as to be protected against injury in the event of an accident. The arms of the infant are located within the space defined by the side walls of the carrier so as to be shielded from possible injury should the bicycle tip-over for any reason. Because the infant is in a semi-prone position, the infant cannot easily lift itself out of the carrier; the infant's weight is distributed to a large extent onto the buttocks and back areas so as to make it difficult for the infant to raise out of the carrier. The carrier has a measure of safety against the infant escaping, or falling out, of the carrier while the bicycle is moving.

A principal feature of the invention is the inclusion of an internally padded helmet in association with the infant carrier. The helmet is retained against the rear wall of the carrier body by means of a flexible strap that extends across the upper frontal surface of the helmet. End areas of the strap are attached to the side walls of the carrier body, whereby the strap stabilizes the helmet against movement away from the rear wall of the carrier body.

In the event of a bicycle tip-over accident, the helmet will remain attached to the carrier so that the infant's head and neck will be maintained in a normal orientation relative to the infant's body. By attaching the helmet to the rear wall of the carrier body it is possible to prevent whiplash injuries or head injuries.

The stabilized helmet also has a beneficial restraining action during normal movements of the bicycle. The helmet prevents the infant from raising his head away from the rear wall of the carrier body, whereby the infant has a tendency to lay back in a semi-prone position against the carrier rear wall. As a result, the infant is in a relaxed safe position; the infant is not inclined to struggle out of the carrier.

A horizontal platform is provided on the bicycle for supporting the infant carrier above the bicycle rear wheel. A U-shaped handle structure is swingably attached to the carrier for anchoring the carrier to the horizontal platform in two selected positions of adjustment. The carrier can have a first position facing forwardly, or a second position facing rearwardly. The two alternate positions give the system a degree of versatility that is believed to be lacking in the prior art. Thus, one infant might find the forwardly-facing carrier more comfortable or acceptable, whereas another infant might prefer the rearwardly-facing carrier position. The present invention has an enhanced versatility not found in the prior art.

BRIEF DESCRIPTION OF THE DRAWINGS OF THE PRESENT INVENTION

FIG. 1, is a sectional view, taken through an infant carrier system constructed according to the present invention. The carrier is shown installed on a bicycle directly over the bicycle rear wheel.

FIG. 2, is a transverse sectional view, taken on line 2—2 in FIG. 1.

FIG. 3, is a side elevational view, of the FIG. 1 carrier system, here showing the infant carrier body mounted to face in the rearward direction, i.e. away from the bicycle seat.

DESCRIPTION OF THE PREFERRED EMBODIMENT OF THE PRESENT INVENTION

FIG. 1, is a sectional view, taken through an infant carrier system constructed according to the present invention. The carrier is shown installed on a bicycle directly over the bicycle rear wheel.

FIG. 2, is a transverse sectional view, taken on line 2—2 in FIG. 1.

As shown in FIG. 1 and 2, the invention comprises a protective infant carrier system mounted on a bicycle 10 directly over the bicycle rear wheel 12. The system includes a horizontal platform 14 having a front edge 15, a rear edge 16, and two side edges 17.

Bicycle 10 has a rear fork structure 19 that includes a transverse connector bar 30. An upper clamp element 31 extends forwardly from platform 14 so as to rest on connector bar 30. A lower clamp element 33 has two spaced ears pivotably attached to clamp element 31, whereby clamp element 33 is enabled to have pressure engagement with the undersurface of connector bar 30.

A manual screw 34 has threaded engagement with platform 14, such that rotation of the screw causes clamp element 33 to be clamped against bar 30, or unclamped from bar 30, depending on the direction of screw 34 rotation. A thumb wheel on the upper end of screw 34 enables the screw to be manually rotated without tools or turning implements.

The rear portion of platform 14 is supported by two strut systems located alongside wheel 12. Each strut system comprises a main rod, or tube, 35, and two auxiliary rods, or tubes, 37. The upper ends of the rods (or tubes) 37 are flattened and then riveted to a bracket 39 located on the underside of platform 14. The lower ends of rods (or tubes) 35 are attached to the bicycle frame by means of screws or bolts.

It will be seen that platform 14 is supported on the bicycle by the cooperative action of the clamp elements 31,33 and the strut systems 35,37. The platform 14 and associated hardware can be removed from the bicycle when so desired.

An infant carrier body 41 is releasably supported on platform 14 in the space above the bicycle rear wheel 12. The carrier body 41 comprises a rear wall 43, a lower wall 45, and two side walls 47. Various materials can be used to form the carrier body. However, a preferred construction comprises a rigid one-piece plastic molding for reasons of strength and ease of cleaning. The interior surfaces of the carrier body 41 can be covered with a soft resilient foam lining 49, to provide a measure of comfort for the infant; the skin of the soft lining can be non-porous for easy cleaning.

As shown in FIG. 1, rear wall 43 and lower wall 45 form a continuous and uninterrupted arcuate wall structure centered on a point 51 located above wall 45. The arcuate configuration forms a concave infant-support surface that forces the infant to lie in a slumped semi-prone position in the carrier body. The arcuate length of the arcuate wall structure is sufficient that the infant is essentially fully enclosed by the side walls 47, with the infant's feet being approximately directly above the front edge 53 of lower wall 45.

The illustrated carrier body is designed specifically for use by infants; i.e., children less than two years old. The carrier is not suitable for larger children. As viewed in FIG. 1, the carrier body 41 has a curved cradle configuration that causes the infant to lie in a slumped position. The weight of the infant is displaced a significant distance behind the front edge 53 of lower wall 45, so that the infant has difficulty in rising out of the carrier. The infant is thus less likely to want to escape from the carrier while the bicycle is in motion.

Side walls 47 of the carrier body extend continuously from the front edge 53 of the wall 45 to the upper edge 55 of rear wall 43. Upwardly facing edges 56 of the side walls are spaced substantial distances from the arcuate wall structure 43, 45 so that the side walls form an enclosure for the infant. The infant's arms are necessarily located within the space formed by the side walls 47, thereby protecting the infant from injury in the event of a tip-over accident.

As a principal feature of the invention, there is provided an internally padded helmet 57. While the infant is in the carrier body the helmet 57 is worn for head injury protection in the event of an accident.

The helmet 57 is relatively heavy, and would be uncomfortable, and possibly dangerous, if worn without some auxiliary support; i.e., the weight of the helmet could unduly stress the infant's neck and shoulder muscles, especially if the infant were to move his, or her, head back and forth, or side to side. Therefore, a retaining means is provided for releasably retaining the helmet in an essentially fixed position against the rear wall 43 of the carrier body 41.

In the illustrated system the helmet is supported and restrained by a flexible strap 59. One end of the strap 59 is permanently affixed to the outer surface of one side wall 47 at a point proximate to the upper edge of the carrier body. The strap extends forwardly from rear wall 43 and around helmet 57, so as to pass across the upper frontal surface 61 of the helmet. The strap 59 then continues around the helmet 57 and onto the other side wall 47 of the carrier body.

The free end of strap 59 has a patch of adhesive material that mates with an adhesive patch 64 affixed to the outer side surface of said other side wall 47. The adhesive materials are preferably commercially available hook-and-loop materials, e.g., materials marketed under the trademark VELCRO.

The intermediate section of the strap 59, in registry with the frontal surface of the helmet 57, is attached to the helmet by means of a second adhesive patch 63 affixed to the helmet surface. The rear surface of strap 59 has an adhesive strip, or layer, that mates with patch 63 to secure the strap to the frontal surface of the helmet. Patch 63 and the associated adhesive section of strap 59 can be formed of adhesive hook-and-loop materials, i.e., the materials marketed under the trademark VELCRO.

It will be seen that helmet 57 is completely removable from carrier body 41. The helmet 57 is placed on the infant's head while the infant is in the carrier body, or prior to being placed in the carrier body. The helmet has a chin strap, not shown, for safety purposes. With the helmet in position on the infant's head, the strap 59 is drawn across the helmet frontal surface 61 and over to the adhesive patch 64. The strap is secured to the helmet and to the carrier body by adhesive patches 64 and 63. As noted earlier, one end of strap 59 is permanently anchored (secured) to a side wall of the carrier body. The strap remains attached to the carrier body when it is disconnected from the helmet.

When the infant is positioned in the carrier body, the strap 59 stabilizes the helmet 57 in a fixed position, such that the helmet produces a minimal loading on the infant's head and neck. In the event of an accident the strap 59 prevents the helmet from moving away from wall 43 in such a way as to possibly cause serious head or neck injuries.

FIG. 3, is a side elevational view, of the FIG. 1 carrier system, here showing the infant carrier body mounted to face in the rearward direction, i.e. away from the bicycle seat.

A safety belt means is provided for holding the infant's body in the carrier. The safety belt means can comprise a lower flexible belt 65 anchored to wall 45 near its front edge 53, and two upper belts 67 anchored to wall 43 near the wall upper edge 55. The upper belts 67 are adapted to go over the infant's shoulders and down to a buckle structure 69 (FIG. 3), that is attached to the free end of the lower belt 65. Belt 65 will be trained between the infant's legs, such that the belt system will have a Y configuration for effectively holding the infant in the carrier body.

At the front edge of platform 14 there is provided an upwardly facing saddle 70 having a notch adapted to receive the web 71 of a carrying handle 73 for the infant carrier body 41. Handle 73 has a U-shape, defined by web 71 and two parallel arms 75 extending alongside the side walls of the carrier body. The ends of arm 75 are pivotably connected to the carrier body side walls, whereby the U-shaped handle can swing around a pivot axis 77.

Handle 73 forms part of the mechanism for mounting carrier body 41 on platform 14. Web 71 of the handle fits in the notch of saddle 70, to prevent the carrier body 41 from sliding along the platform surface in a front-to-rear direction. A deflectable spring clip 79 has its lower end affixed to the front surface of saddle 70 to prevent any undesired lifting movement of web 71 out of the saddle. The upper end of the spring clip can be manually deflected in the forward direction when it is desired to lift web 71 out of the saddle.

The arcuate wall structure 43, 45 is recessed along its undersurface to provide two downwardly extending flanges 81. As shown in FIG. 2, these flanges are located alongside the side edges 17 of platform 14 to prevent transverse dislocation of the carrier body relative to the platform 14.

The carrier body 41 can be held down on platform 14 by two similarly constructed elastic straps 83. Each elastic strap 83 has metal end fittings 85 that are apertured to fit onto pins 87 located on the carrier body and platform 14. As shown in FIG. 2, each lower pin 87 extends from an angle bracket 89 affixed to platform 14, whereas the corresponding upper pin 87 is mounted directly on the side wall of carrier body 41. The pin-strap relationship is duplicated at each side of the carrier body-platform construction.

The elasticity of straps 83 is such that the straps can be manually pulled to elongate the straps for connection to the pins 87. The tensioned straps act as hold-down devices to prevent the carrier body 41 from lifting off the platform 14 while the bicycle is moving.

Carrier body 41 can be selectively positioned on platform 14 to face forwardly or rearwardly. FIG. 1 shows the carrier body facing in a forward direction, i.e., facing the bicycle seat 11. FIG. 3 shows the carrier body facing in the rearward direction. The purpose of this selective positionment is merely to provide a choice for the infant. One infant might be more comfortable facing forwardly, whereas another infant might be more comfortable facing rearwardly.

Handle 73 is swingable around pivot axis 77 through an arc of at least two hundred ten (210) degrees in order to permit the selective positioning of the carrier body 41 on platform 14. When the carrier body 41 is placed in the FIG. 3 position it is necessary to change the locations of elastic straps 83 relative to the lowermost anchoring pins. As shown in FIG. 3, two additional anchoring pins 91 are carried by platform 14 for anchoring the lower ends of straps 83 when the carrier body 41 is in the rearwardly-facing position.

A principal feature of the invention is the employment of a stabilized helmet 57 in association with the infant carrier body 41, whereby injury to the infant is minimized, or prevented, in the event of an accident. The helmet is stabilized by the attachment strap 59, such that during normal bicycle operations, the helmet presents a minimal load on the infant's head and neck areas.

The carrier is detachable from platform 14 so that it can be used separately (apart) from its usage on the bicycle. The infant is effectively retained in the carrier so that he, or she, cannot escape or fall out of the carrier, on or off the bicycle.

The present invention, described above, relates to an Infant Carrier Installable on a Bicycle. Features of the present invention are recited in the appended claims. The drawings contained herein necessarily depict structural features and embodiments of the Infant Carrier Installable on a Bicycle, used in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A protective infant carrier system, comprising:

a platform;

means for mounting said platform in a horizontal position directly above the rear wheel of a bicycle;

a carrier body having a cradle configuration releasably supported on said platform so that the carrier body can be removed from the platform with an infant positioned in the carrier body;

said carrier body comprising a rear wall, lower wall and two side walls;

said rear wall and said lower wall being a continuous arcuate wall structure centered on a point located above the lower wall, whereby the infant is required to assume a slumped semi-prone position in the carrier body;

said lower wall having a front edge, and said rear wall having an upper edge;

said side walls extending from the front edge of the lower wall to the upper edge of said rear wall;

said side walls having upwardly facing edges spaced substantial distances from said arcuate wall structure, whereby said side walls provide a protective enclosure for the arms of the infant;

a helmet adapted to be worn by an infant while positioned in the carrier body;

means for releasably retaining said helmet against said rear wall of the carrier body at a point proximate to said upper edge, whereby the infant's head is prevented from movement away from said rear wall;

safety belt means for holding the infant in a slumped semi-prone position in the carrier body;

said helmet retaining means comprising a flexible strap having one end thereof anchored to one of the carrier body side walls at a point proximate to the upper edge of said rear wall;

said flexible strap having a free end adapted to lie against the other side wall of said carrier body;

means for releasably attaching said free end of the strap to said other side wall of the carrier body; and said strap being adapted to extend across the helmet so that the helmet is positioned between the strap and the rear wall of the carrier body.

2. The protective infant carrier system, as described in claim 1, wherein said helmet has an upper frontal surface facing said flexible strap; and adhesive means for adhesively securing said strap to said frontal surface, whereby the helmet is stabilized in a position facing away from the rear wall of the carrier body.

3. A protective infant carrier system, comprising:

a platform;

means for mounting said platform in a horizontal position directly above the rear wheel of a bicycle;

a carrier body having a cradle configuration releasably supported on said platform so that the carrier body can be removed from the platform with an infant positioned in the carrier body;

said carrier body comprising a rear wall, a lower wall and two side walls;

said rear wall and said lower wall being a continuous arcuate wall structure centered on a point located above the lower wall, whereby the infant is required to assume a slumped semi-prone position in the carrier body;

said lower wall having a front edge, and said rear wall having an upper edge;

said side walls extending from the front edge of the lower wall to the upper edge of said rear wall;

said side walls having upwardly facing edges spaced substantial distances from said arcuate wall structure, whereby said side walls provide a protective enclosure for the arms of the infant;

a helmet adapted to be worn by an infant while positioned in the carrier body;

means for releasably retaining said helmet against said rear wall of the carrier body at a point proximate to said upper edge, whereby the infant's head is prevented from movement away from said rear wall;

safety belt means for holding the infant in a slumped semi-prone position in the carrier body;

said platform having a front edge proximate to the seat of the bicycle and a rear edge located beyond the bicycle rear wheel when the platform is installed on a bicycle;

a U-shaped carrying handle for said carrier body;

said carrying handle comprising a web, two arms extending from said web alongside the side walls of the carrier body, and pivotal connections between said arms and the side walls of the carrier body, whereby the handle can swing around an axis defined by the pivotal connections;

means for anchoring said carrier body on said platform;

said anchoring means comprising a saddle located on said platform at the platform front edge; and said saddle being adapted to receive the web of the carrying handle, whereby the carrier body is precluded from sliding off the platform.

4. The protective infant carrier system, as described in claim 3, wherein said carrying handle has a swing length of at least two hundred ten (210) degrees, whereby the carrier body can have a first forwardly-facing position wherein the front edge of the carrier body lower wall is located near the saddle, or a second rearwardly-facing position wherein the front edge of the carrier body lower wall is located near the platform rear edge.

5. The protective infant carrier system, as described in claim 4, wherein said platform has two side edges spaced apart to define the transverse width dimension of the platform; and said arcuate wall structure having two downwardly extending flanges spaced apart to lie alongside the side edges of the platform, whereby the carrier body is prevented from dislocation in the transverse direction.

* * * * *